(12) United States Patent
Overbeck et al.

(10) Patent No.: US 10,181,214 B2
(45) Date of Patent: Jan. 15, 2019

(54) SMOOTH DRAPING LAYER FOR RENDERING VECTOR DATA ON COMPLEX THREE DIMENSIONAL OBJECTS

(71) Applicant: Google Inc., Mountain View, CA (US)

(72) Inventors: Ryan Styles Overbeck, San Francisco, CA (US); Janne Kontkanen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1305 days.

(21) Appl. No.: 13/827,964

(22) Filed: Mar. 14, 2013

(65) Prior Publication Data

US 2014/0267257 A1 Sep. 18, 2014

(51) Int. Cl.
*G06T 15/04* (2011.01)
*G06T 17/05* (2011.01)

(52) U.S. Cl.
CPC .............. *G06T 15/04* (2013.01); *G06T 17/05* (2013.01)

(58) Field of Classification Search
CPC ......... G06T 19/00; G06T 17/20; G06T 17/00; G06T 15/10; G06T 15/00; G06T 15/405; G06T 15/40; G06T 15/005; G06T 15/503
See application file for complete search history.

(56) References Cited

U.S. PATENT DOCUMENTS

| | | | |
|---|---|---|---|
| 6,301,496 B1 * | 10/2001 | Reisfeld | 600/407 |
| 6,894,695 B2 * | 5/2005 | vanWelzen | 345/582 |
| 7,505,036 B1 * | 3/2009 | Baldwin | 345/421 |
| 2002/0145615 A1 * | 10/2002 | Moore | 345/629 |
| 2003/0112237 A1 * | 6/2003 | Corbetta | 345/426 |
| 2004/0257373 A1 | 12/2004 | Doyle et al. | |
| 2006/0203010 A1 | 9/2006 | Kirchner et al. | |
| 2008/0082549 A1 * | 4/2008 | Baker et al. | 707/10 |
| 2008/0215390 A1 * | 9/2008 | Gipps et al. | 705/7 |
| 2009/0193327 A1 * | 7/2009 | Roychoudhuri et al. | 715/231 |
| 2010/0074538 A1 | 3/2010 | Mishra et al. | |
| 2010/0131903 A1 * | 5/2010 | Thomson et al. | 715/847 |

(Continued)

OTHER PUBLICATIONS

Kor, Rashpal; 2009; "Terrain Rendering Based on GeoMipMapping Algorithm Using OpenGL"; Computer Graphics and Virtual Reality; pp. 231-236.*

(Continued)

*Primary Examiner* — Todd Buttram
(74) *Attorney, Agent, or Firm* — Dority & Manning, P.A.

(57) ABSTRACT

Systems and methods for rendering vector data in conjunction with a three-dimensional model are provided. In particular, a smooth transparent draping layer can be generated and rendered overlaying the three-dimensional model. The vector data can be texture mapped to the smooth transparent draping layer such that the vector data appears to be located along a surface in the three-dimensional model. The three-dimensional model can be a model of a geographic area and can include terrain geometry that models the terrain of the geographic area and building geometry that models buildings, bridges, and other objects in the geographic area. The smooth transparent draping layer can conform to the surfaces defined by the terrain geometry. The vector data can be texture mapped to the smooth transparent draping layer such that the vector data appears to be located along the surface of the terrain geometry but can be occluded by the building geometry.

3 Claims, 6 Drawing Sheets

(56) References Cited

U.S. PATENT DOCUMENTS

| | | | |
|---|---|---|---|
| 2011/0115813 A1 | 5/2011 | Yamakura | |
| 2011/0158504 A1* | 6/2011 | Turner et al. | 382/154 |
| 2011/0206273 A1 | 8/2011 | Palgemann et al. | |
| 2012/0200702 A1 | 8/2012 | Wilson et al. | |
| 2012/0206468 A1 | 8/2012 | Bratt et al. | |
| 2012/0218261 A1 | 8/2012 | Falchetto | |
| 2012/0232719 A1 | 9/2012 | Salmon et al. | |
| 2013/0009950 A1* | 1/2013 | Ben-David et al. | 345/419 |
| 2013/0083015 A1* | 4/2013 | Hernandez Esteban | 345/419 |
| 2013/0127889 A1* | 5/2013 | Winnemoeller et al. | 345/582 |
| 2014/0200863 A1* | 7/2014 | Kamat et al. | 703/1 |
| 2014/0218390 A1* | 8/2014 | Rouet et al. | 345/612 |
| 2014/0232734 A1* | 8/2014 | Nigam et al. | 345/584 |

OTHER PUBLICATIONS

International Search Report from PCT/US2014/023114—3 pages.
Kersting et al., "Interactive 3D Visualization of Vector Data in GIS", Proceedings of the 10$^{th}$ ACM International Symposium on Advances in Geographic Information Systems, McLean, Virginia, Nov. 4-9, 2002, pp. 107-112.
Schilling et al., "Vector Based Mapping of Polygons on Irregular Terrain Meshes for Web 3D Map Services", Proceedings of the Third International Conference on Web Information Systems and Technologies, Barcelona, Spain, Mar. 3-6, 2007, pp. 198-205.
Schneider et al., "Real-Time Rendering of Complex Vector Data on 3D Terrain Models", Proceedings of the 11$^{th}$ International Conference on Virtual Systems and Multimedia, Flanders, Belgium, Oct. 2005, pp. 573-582.
Weinhaus et al., "Texture Mapping 3D Models of Real-World Scenes", Journal of the Association for Computing Machinery Computing Surveys, vol. 29, Issue 4, Dec. 1997, pp. 325-365.

* cited by examiner

SMOOTH DRAPING LAYER FOR RENDERING VECTOR DATA ON COMPLEX THREE DIMENSIONAL OBJECTS

FIELD

The present disclosure relates generally to computer graphics and more particularly, to rendering vector data in conjunction with three-dimensional objects in a computer graphics application.

BACKGROUND

Improvements in computer processing power and broadband technology have led to the development of interactive three-dimensional models. For instance, interactive geographic information systems can provide for the navigating and displaying of three-dimensional representations of geographic areas. A user can navigate the three-dimensional representation by controlling a virtual camera that specifies what portion of the three-dimensional representation is rendered and presented to a user.

The three-dimensional model can include geometry and texture that is texture mapped to the geometry. For instance, a three dimensional model of a geographic area can include terrain geometry that models the terrain of the Earth in addition to building geometry that models buildings, bridges, and other objects. Geographic imagery, such as aerial or satellite imagery, and other imagery can be texture mapped to the terrain geometry and/or the building geometry to provide a more realistic model of the geographic area.

Vector data can be rendered in conjunction with the three dimensional model. Vector data can include data such as labels, overlays, road overlays, text, and other data. One approach to rendering vector data in conjunction with the three-dimensional model is to render the vector data in the three-dimensional space defined by the model. This can require complex projection calculations and can require tracing many rays to place the vector data correctly relative to the surface of the three-dimensional model. It can also be difficult to consistently place the vector data correctly using this approach.

Another approach to rendering vector data in conjunction with the three-dimensional model is to texture map the vector data to the three-dimensional model. However, certain objects within the three-dimensional model can include lumpy, edgy and awkward geometry. As a result, texture mapping vector data directly to the three-dimensional model can lead to the vector data becoming unreadable or placed incorrectly.

SUMMARY

Aspects and advantages of the invention will be set forth in part in the following description, or may be obvious from the description, or may be learned through practice of the invention.

One exemplary aspect of the present disclosure is directed to a computer-implemented method of rendering vector data in conjunction with a three-dimensional model. The method includes presenting a viewport in a user interface on a display device and rendering a three-dimensional model in the viewport. The method further includes rendering a transparent draping layer overlaying the three-dimensional model and texture mapping the vector data to the transparent draping layer such that the vector data appears to be located along a surface of the three-dimensional model in the viewport.

Other exemplary aspects of the present disclosure are directed to systems, apparatus, non-transitory computer-readable media, user interfaces and devices for rendering vector data in conjunction with a three-dimensional model, such as a three-dimensional model of a geographic area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
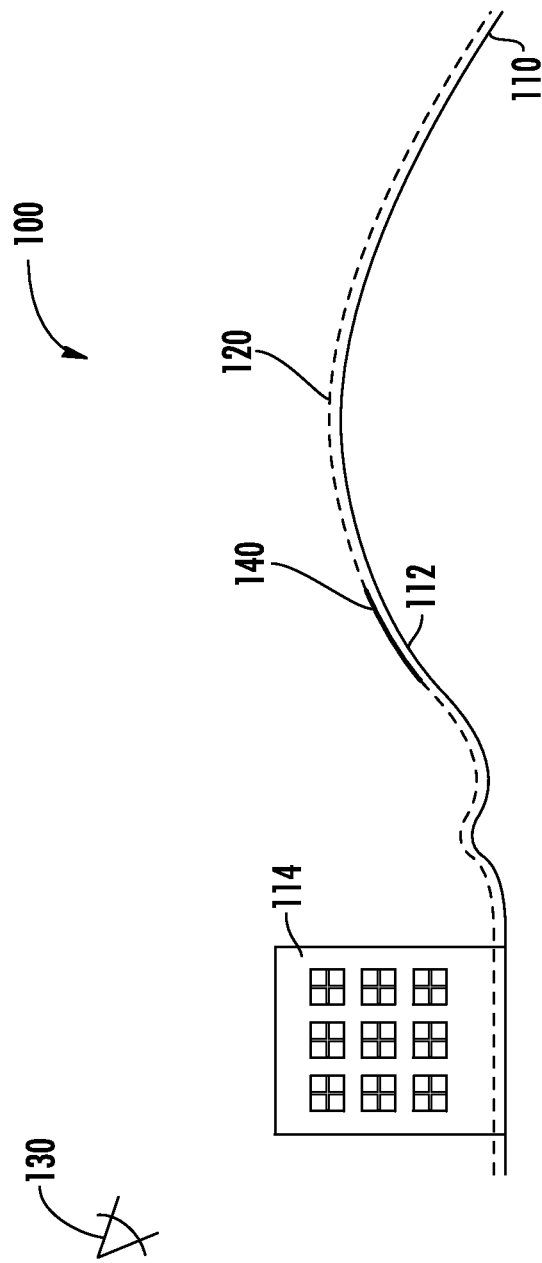
FIG. 1 depicts a simplified representation of a three-dimensional model of a scene according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for rendering vector data (e.g. text, labels, overlays, roads, etc.) in conjunction with a three-dimensional model. In particular, a smooth transparent draping layer can be generated and rendered overlaying the three-dimensional model. The smooth transparent draping layer can conform to one or more surfaces of the three-dimensional model. The vector data can be texture mapped to the smooth transparent draping layer such that the vector data appears to be located along a surface in the three-dimensional model. In this manner, the systems and methods of the present disclosure can have a technical effect of reducing visual artifacts that may result from directly mapping the vector data to surfaces in the three-dimensional model with complex geometry (e.g. hard edges, bumps, etc.).

In one embodiment, the three-dimensional model can be a model of a geographic area. The three-dimensional model can include terrain geometry that models the terrain of the geographic area and building geometry that models buildings, bridges, and other objects in the geographic area. The three-dimensional model can be a polygon mesh (e.g. a triangle mesh) that is generated, for instance, using stereo reconstruction techniques. During rendering of a representation of the geographic area, a smooth transparent draping layer can be rendered overlaying the terrain geometry. For instance, the smooth transparent draping layer can conform to the surfaces defined by the terrain geometry. The vector data can be texture mapped to the smooth transparent draping layer such that the vector data appears to be located along the surface of the terrain geometry. In particular aspects, the smooth transparent draping layer and the vector data can be rendered such that the vector data can be occluded by the building geometry in the representation of the geographic area.

Various rendering algorithms can be used to render a scene depicting vector data in conjunction with the three-dimensional model according to exemplary aspects of the present disclosure. For instance, in one embodiment, the smooth transparent draping layer can be rendered with a depth offset relative to the terrain geometry. According to another exemplary embodiment, the rendering algorithm can render building geometry with a first stencil value in a stencil buffer associated with the scene. The terrain can then be rendered with a second stencil value in the stencil buffer. The depth buffer can be cleared for all pixels in the scene associated with the second stencil value. The transparent draping layer can then be rendered with depth write and depth test both on. This provides for the rendering of the transparent draping layer in front of the terrain geometry. However, the transparent draping layer can still be occluded by building geometry in areas where the building geometry is in front of the terrain geometry.

The smooth transparent draping layer can be generated from the three-dimensional model. For instance, in one implementation, the transparent draping layer can be generated by accessing a three-dimensional model. The terrain geometry can be extracted from the three-dimensional model. The terrain geometry can be smoothed according to a suitable smoothing algorithm (e.g. a Gaussian smoothing algorithm) to generate smooth terrain geometry. The transparent draping layer can then be generated from the smooth terrain geometry, for instance, using a suitable meshing algorithm. A transparent draping layer can be generated for each level of detail of the three-dimensional model. In addition, the transparent draping layer for each level of detail can be spatially partitioned into a plurality of geospatial data objects and stored in a hierarchical tree data structure.

With reference now to the FIGS., exemplary embodiments of the present disclosure will now be discussed in detail. FIG. 1 depicts a simplified representation of an exemplary three-dimensional model 110 of a scene 100 according to an exemplary embodiment of the present disclosure. While FIG. 1 illustrates a two-dimensional representation of the three-dimensional model for purposes of illustration and discussion, one of ordinary skill in the art, using the disclosures provided herein, will recognize that two-dimensional representations can be representative of three-dimensional elements.

The three-dimensional model 110 can be representative of a geographic area. For instance, the three-dimensional model 110 can be a model of a geographic area provided by a geographic information system, such as the Google Maps™ mapping application and the Google Earth™ virtual globe application provided by Google Inc. The three-dimensional model 110 can also be other suitable three-dimensional models.

The three-dimensional model 110 can be a polygon mesh, such as triangle mesh or other mesh. The mesh can include a plurality of polygons (e.g. triangles) that are used to model the geometry of a geographic area. In one example, the three-dimensional model 110 can be a stereo reconstruction generated from aerial or satellite imagery of the geographic area. The three-dimensional model 110 can include terrain geometry 112 and building geometry 114. The terrain geometry 112 can model the terrain of the geographic area. The building geometry 114 can model building and other objects in the geographic area.

Vector data 140 (e.g. text, overlays, roads, etc.) is rendered in conjunction with the three-dimensional model 110. In particular, the vector data 140 is texture mapped to a smooth transparent draping layer 120. The smooth transparent draping layer 120 is a transparent layer (i.e. invisible layer) that overlays the surface of the terrain geometry 112. In particular, the smooth transparent draping layer 120 conforms to the surface of the terrain geometry 112. In FIG. 1, the smooth transparent draping layer 120 does not conform or overlay the surfaces defined by the building geometry 114.

The geometry of the smooth transparent draping layer 120 has been smoothed, for instance, by a suitable smoothing algorithm (e.g. a Gaussian smoothing algorithm) so that the smooth transparent draping layer 120 provides a suitable smooth surface for texture mapping the vector data 140. During rendering of three-dimensional model 110, the vector data 140 is texture mapped to the smooth transparent draping layer 120 so that it appears that the vector data 140 is located along a surface of the three-dimensional model 110, such as along the terrain geometry 112 of the three-dimensional model 110. The building geometry 114 can occlude at least a portion any vector data 140 texture mapped to the smooth transparent draping layer 120.

The three-dimensional model 110 can be rendered from the perspective of a virtual camera 130. The virtual camera 130 defines what three-dimensional data to display to a user, for instance in a viewport presented in a user interface on a display device. A user can navigate the three dimensional model 110 by navigating the virtual camera 130 relative to the three-dimensional model 110.

Figure 2:
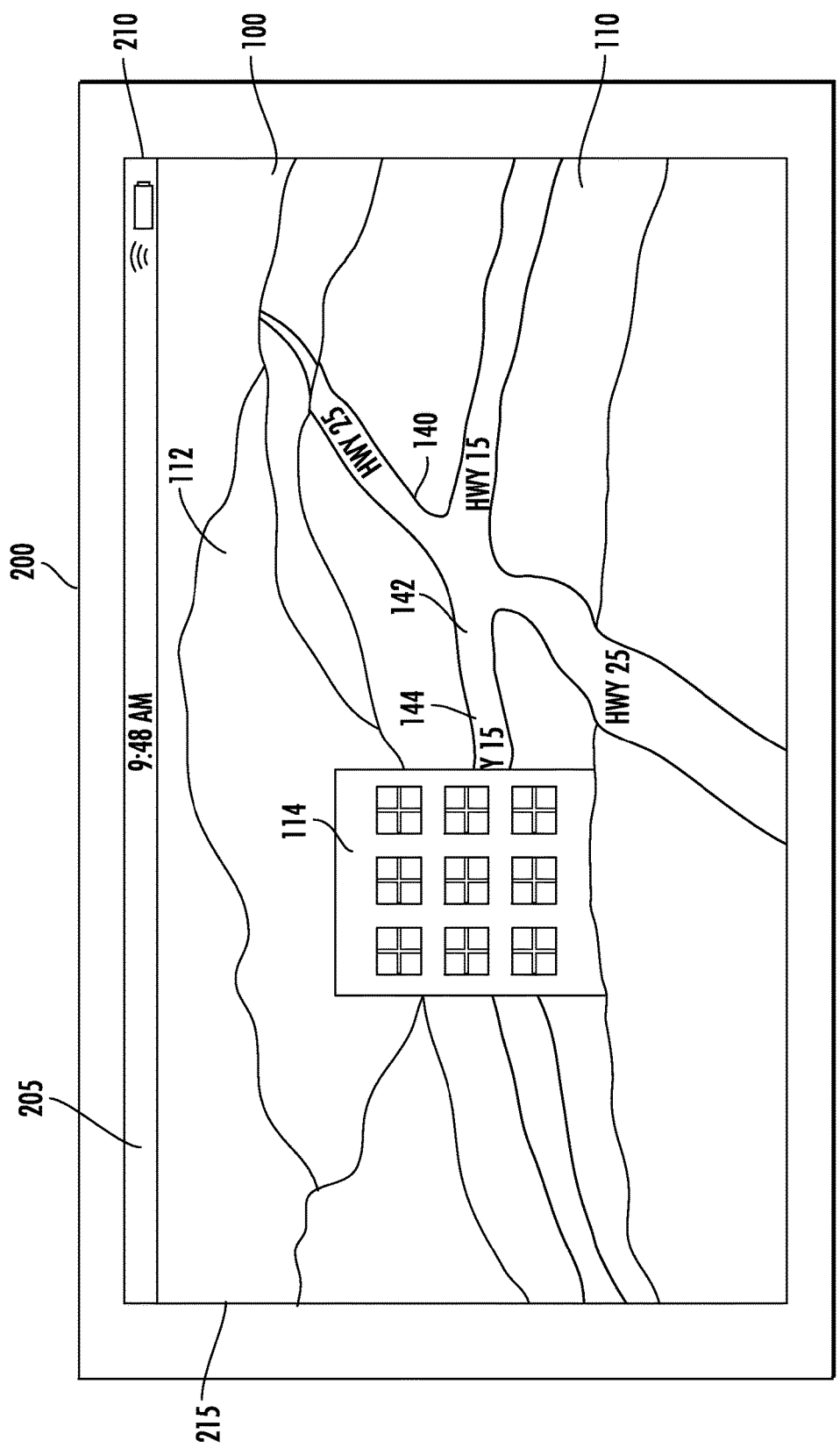
FIG. 2 depicts a portion of a three-dimensional model presented in a viewport according to an exemplary embodiment of the present disclosure.

FIG. 2 depicts a view of a portion of the three-dimensional model 110 rendered in a viewport 215 presented in a user interface 205 on a display device 210. The three-dimensional model 110 can be presented from a perspective of the virtual camera 130 positioned as shown in FIG. 1. The display device 210 can be part of an exemplary computing device 200. The computing device 200 can be any suitable computing device, such as general purpose computing device, a mobile device, smartphone, tablet, laptop, desktop, or other suitable computing device.

As shown, the view of three-dimensional model 110 provides a representation of a scene 100 depicting a geographic area. The three-dimensional model 110 includes terrain geometry 112 providing a representation of the terrain of the geographic area. The three-dimensional model 110 also includes building geometry 114 that provides a representation of a building in the geographic area.

Vector data 140 is rendered in conjunction with the three-dimensional model 110. The vector data 140 includes road overlays 142 depicting the locations of roads in the geographic area. The vector data 140 also includes various text annotations 144 depicted in conjunction with the three-dimensional model 110. Other vector data can be included in the representation of the geographic area.

The vector data 140 is texture mapped to a smooth transparent draping layer that conforms to the terrain geometry 112. Portions of the smooth transparent draping layer that do not include vector data are invisible or are completely transparent. As such, the smooth transparent draping layer is not readily visible in the representation of the three-dimensional model 110 presented in the viewport 215. The vector data 140 texture mapped to the smooth transparent draping layer, however, appears to be rendered along the surface of the terrain geometry 112 of the three-dimensional model 110.

The smooth transparent draping layer can be occluded by building geometry 114 of the three-dimensional model 110. As a result, vector data 140 texture mapped to the smooth transparent draping layer can also be occluded by the building geometry 114. This is depicted in FIG. 2 which shows the building geometry 114 occluding text annotation 144 and a portion of the road overlays 142 texture mapped to the smooth transparent draping layer.

Figure 3:
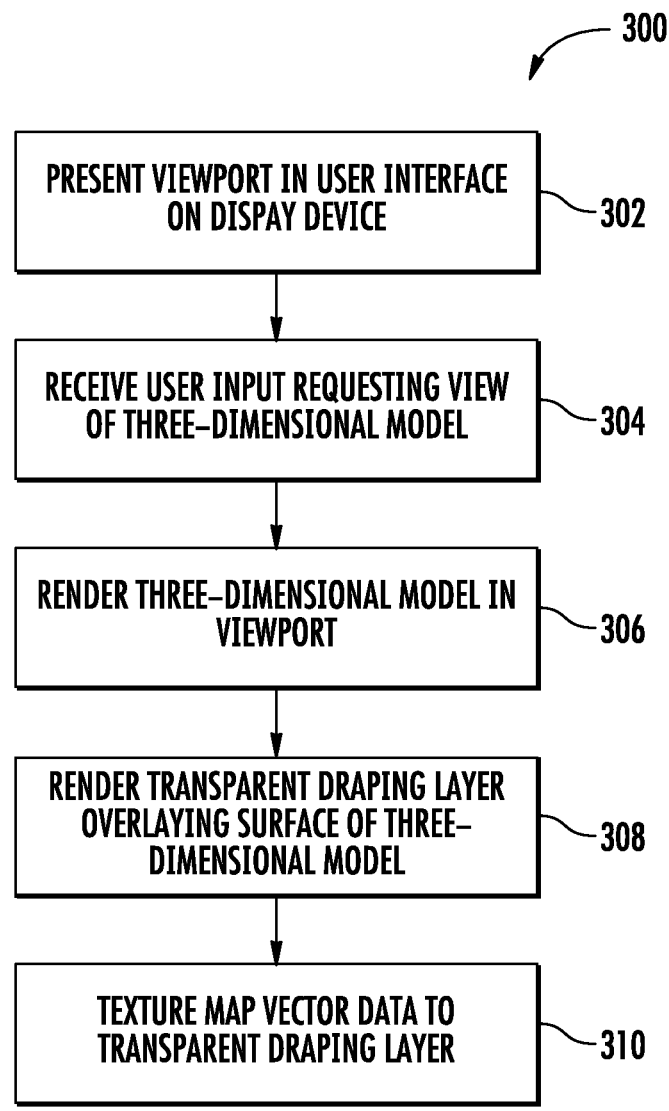
FIG. 3 depicts a flow diagram of an exemplary method for rendering vector data in conjunction with a three-dimensional model according to an exemplary embodiment of the present disclosure.

FIG. 3 depicts a flow diagram of an exemplary method (300) for rendering vector data in conjunction with a three-dimensional model according to an exemplary embodiment of the present disclosure. The method (300) can be implemented using any suitable computing system, such as the system depicted in FIG. 6. In addition, the flow charts of the methods provided herein depict steps performed in a particular order for purposes of illustration and discussion. One skilled in the art, using the disclosures provided herein, will appreciate that various steps of any of the methods discussed herein can be omitted, rearranged, combined and/or adapted in various ways.

At (302), the method includes presenting a viewport in a user interface on a display of a computing device. The viewport defines a space in the user interface for viewing and navigating a three-dimensional model. For instance, FIG. 2 depicts a viewport 215 presented in a user interface 205 that allows a user to view and navigate geographic imagery. The viewport can have any suitable size, shape, or configuration in the user interface.

At (304) of FIG. 3, the method can include receiving a user input requesting a particular view of the three-dimensional model. The user input can be received using any suitable user input, such as touch interaction, click interaction, or other suitable user interaction. The user input can control the position of a virtual camera relative to the three-dimensional model. The virtual camera can be used to construct a view specification which specifies what portion of the three-dimensional model is to be rendered in response to the user input.

Referring back to FIG. 3 at (306), a three-dimensional model can be rendered in the viewport. For instance, the three-dimensional model can be rendered in accordance with the view specification. The three-dimensional model can provide a representation of a scene, such as a geographic area or other suitable scene. For instance, as shown in FIG. 2, a three-dimensional model 110 of scene 100 is rendered in the viewport 215. The three-dimensional model 110 can include terrain geometry 112 and building geometry 114.

At (308) of FIG. 3, a smooth transparent draping layer is rendered overlaying at least one surface in the three-dimensional model. The smooth transparent draping layer can be rendered overlaying any suitable surface. For instance, in the three-dimensional model 110 of FIGS. 1 and 2, the smooth transparent draping layer 120 is rendered overlaying surfaces defined by the terrain geometry 112. In particular, the smooth transparent draping layer conforms to the surface of the terrain geometry 112.

At (310) of FIG. 3, the vector data is texture-mapped to the smooth transparent draping layer. Texture mapping is a method for adding detail, surface texture, or color to a three-dimensional model. Texture mapping the vector data to the transparent draping layer applies the vector data to the surface of the transparent draping layer. Many texture mapping techniques are known for texture mapping data to a surface of a three-dimensional model. Any suitable texture mapping technique can be used without deviating from the scope of the present disclosure.

Because the transparent draping layer overlays a surface of the three-dimensional model, texture mapping the vector data to the transparent draping layer causes the vector data to appear as if the vector data is rendered along a surface of the three-dimensional model. For instance, as shown in FIG. 2, the vector data 140 is texture mapped to a smooth transparent draping layer such that the vector data appears to be located along a surface of the three-dimensional model 110 of the viewport. In particular, the vector data 140 appears to be located along the surface of the terrain geometry 112 of the three-dimensional model 110. The transparent draping layer remains invisible for portions of the transparent draping layer that do not include vector data. For instance, the alpha values for portions of the transparent draping layer can be about zero such that portions of the transparent draping layer that do not include vector data remain transparent.

Various rendering algorithms can be used to render the vector data in conjunction with the three-dimensional model according to exemplary aspects of the present disclosure. For instance, in one embodiment, the smooth transparent draping layer can be rendered with a depth offset relative a surface of the three-dimensional model. The depth offset can provide depth values for the transparent draping layer that are in front of depth values associated with the surface of the three-dimensional model in a depth buffer associated with the scene. As a result, the transparent draping layer can be rendered overlaying the three-dimensional model.

In particular aspects where the three-dimensional model includes terrain geometry and building geometry, such as the three-dimensional model 110 of FIGS. 1 and 2, the depth offset for the transparent draping layer can be provided relative to the terrain geometry. The depth offset for the transparent draping layer is not provided relative to the building geometry. As a result, depth values in the depth buffer associated with the building geometry can be in front of depth values associated with the transparent draping layer. In this way, the transparent draping layer can be rendered overlaying the terrain geometry but can be occluded by the building geometry during rendering of the scene.

Figure 4:
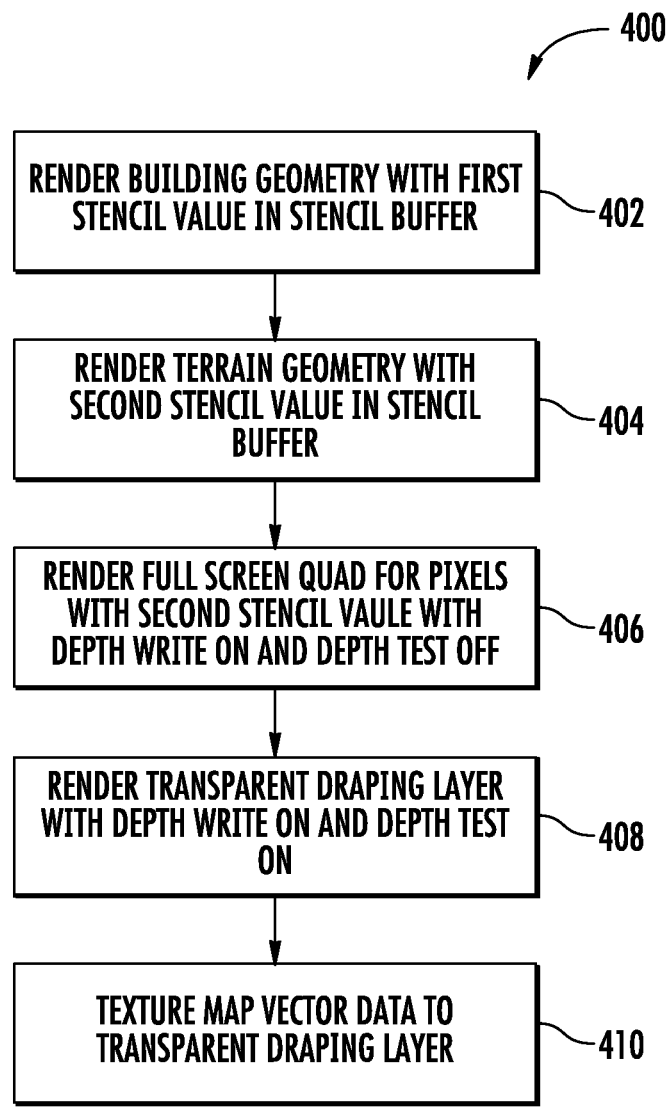
FIG. 4 depicts a flow diagram of an exemplary rendering method for rendering a smooth transparent draping layer according to an exemplary embodiment of the present disclosure.

FIG. 4 depicts a flow diagram of another exemplary method (400) that can be used to render a scene according to an exemplary embodiment of the present disclosure. The exemplary method (400) of FIG. 4 is particularly suitable for implementations with terrain geometry and building geometry. The method (400) can be implemented by any suitable computing device, such as the client computing device 630 of FIG. 6.

At (402), the method includes rendering the building geometry with a first stencil value (e.g. zero) in a stencil buffer for pixels associated with the building geometry. At (404), the terrain geometry is rendered with a second stencil value (e.g. one) for pixels associated with the terrain geometry. The stencil buffer can be an extra buffer associated with the scene that can be used to limit the area of rendering.

The rendering method can then clear the depth values in a depth buffer for all pixels associated with the second stencil value in the stencil buffer. The depth buffer (i.e. z-buffer) can be used to manage image depth coordinates during rendering of the scene. Clearing depth values for pixels in the depth buffer associated with the second stencil value essentially clears the depth buffer for pixels associated with the terrain geometry.

In one implementation, the rendering method can clear the depth values in the depth buffer by rendering a full screen quad for pixels associated with the second stencil value (e.g. pixels that fail a stencil test) with depth write on (i.e. z-write on) and depth test off (i.e. z-test off) (406). Depth write on (i.e. z-write on) allows depth values to be written to the stencil buffer. Depth test off (i.e. z-test off) indicates that no depth comparison is made prior to writing the depth values to the stencil buffer. In other words, depth values are written to the stencil buffer for pixels associated with the second stencil value in the stencil buffer regardless of the depth values already stored in the depth buffer. This technique can be used to write the maximum depth value in the depth buffer for pixels associated with the second stencil value in the stencil buffer, effectively clearing the depth values for pixels associated with the building geometry.

At (408), the transparent draping layer is rendered with depth write on (i.e. z-write on) and depth test on (i.e. z-test on). Depth test on (i.e. z-test on) provides for the writing of depth values to portions of the depth buffer that pass a depth test (e.g. only writes depth values that are in front of existing depth values in the depth buffer). Because the depth buffer has been cleared with respect to pixels associated with the terrain geometry, the transparent draping layer is rendered in front of the terrain geometry. The depth buffer has not been cleared with respect to pixels associated with the building geometry. As a result, the transparent draping layer can be rendered in front of or behind the building geometry depending on the depth values associated with the transparent draping layer and the building geometry.

At (410), the vector data is texture mapped to the transparent draping layer. Portions of the transparent draping layer that do not include vector data can be rendered with an alpha value of about zero such that the transparent draping layer remains transparent. Texture mapping the vector data to the transparent draping layer renders the vector data such that it appears to be located along a surface of the three-dimensional model in the viewport.

Figure 5:
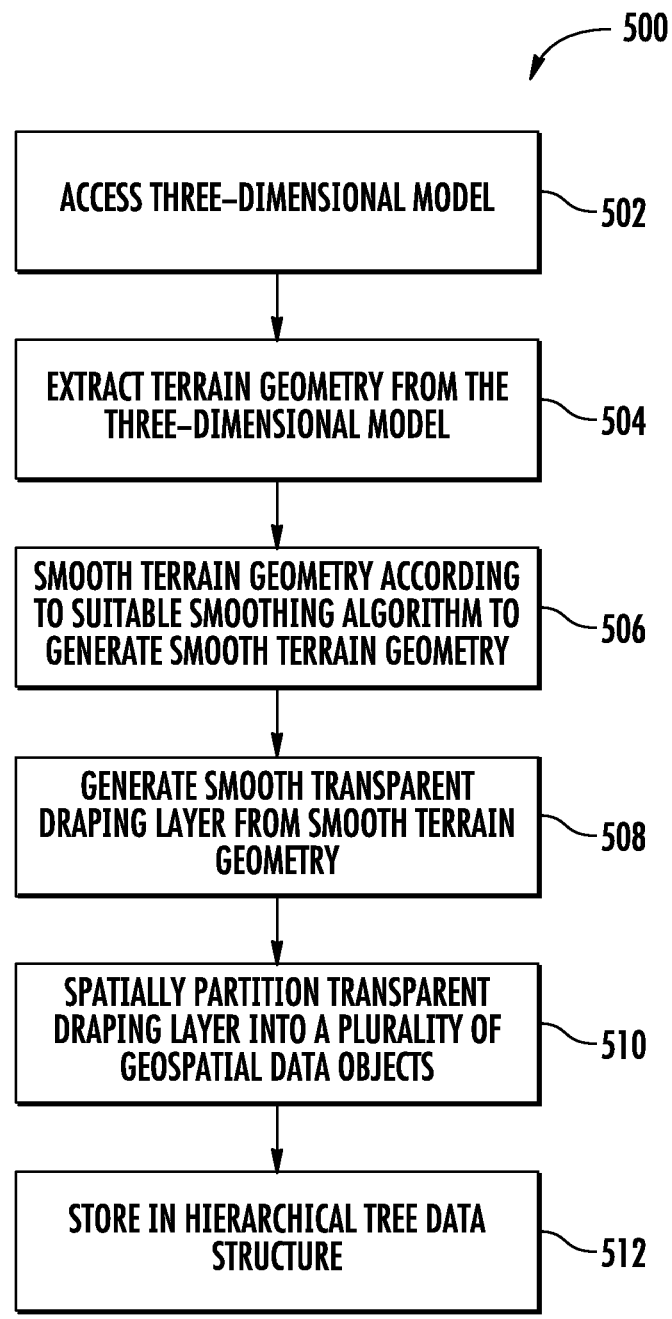
FIG. 5 depicts a flow diagram of an exemplary method for generating a smooth transparent draping layer according to an exemplary embodiment of the present disclosure.

FIG. 5 depicts an exemplary method (500) for generating a smooth transparent draping layer according to an exemplary embodiment of the present disclosure. The exemplary method (500) can be implemented using any suitable computing device, such as the server 610 of FIG. 6.

At (502) of FIG. 5, data associated with a three-dimensional model is accessed. The three-dimensional model can be a stereo reconstruction generated from aerial or satellite imagery of a geographic area. The imagery can be taken by overhead cameras, such as from an aircraft, at various oblique or nadir perspectives. In the imagery, features are detected and correlated with one another. The points can be used to determine a polygon mesh from the imagery. The three-dimensional model can include terrain geometry and building geometry. In certain implementations, the three-dimensional model can be represented as a height field. Each pixel in the height field can have a value indicating a height of the three-dimensional model at the pixel.

At (504), terrain geometry is extracted from the three-dimensional model. Any suitable technique can be used for extracting the terrain geometry from the three-dimensional model. For instance, in one implementation, portions of the three-dimensional model can be classified as either terrain geometry or as non-terrain geometry. Non-terrain geometry can be identified by resampling the model to a higher resolution. A low pass filter can be run across the resampled model. The filtered result can be subtracted from the resampled data to extract only the high pass data. Portions of the high pass data that exceed a predefined threshold can be classified as non-terrain geometry. The non-terrain geometry can be invalidated in the three-dimensional model to extract the terrain geometry from the three-dimensional model. The terrain geometry can be represented as a terrain height field.

At (506), the terrain geometry is smoothed according to a smoothing algorithm to generate smooth terrain geometry. The terrain geometry can be smoothed aggressively using simple image space smoothing algorithms, such as Gaussian smoothing algorithms. The smooth terrain geometry can be represented as a smooth terrain height field. At (508), the smooth transparent draping layer is generated from the smooth terrain geometry. For instance, the smooth terrain height field can be processed using a meshing algorithm (e.g. a marching cubes algorithm) to generate a mesh for the smooth transparent draping layer.

At (510), the smooth transparent draping layer is spatially partitioned into a plurality of discrete geospatial data objects (e.g. discrete geospatial volumes or tiles). Each geospatial data object can store data associated with the portion of the transparent draping layer in the geospatial extent defined by the geospatial data objects. The discrete geospatial data objects can then be stored in a hierarchical tree data structure, such as a quadtree data structure or an octree data structure (512). The method (500) of FIG. 5 can be performed for each level of detail of the three dimensional model so that a different transparent draping layer can be generated for each level of detail of the three-dimensional model.

Figure 6:
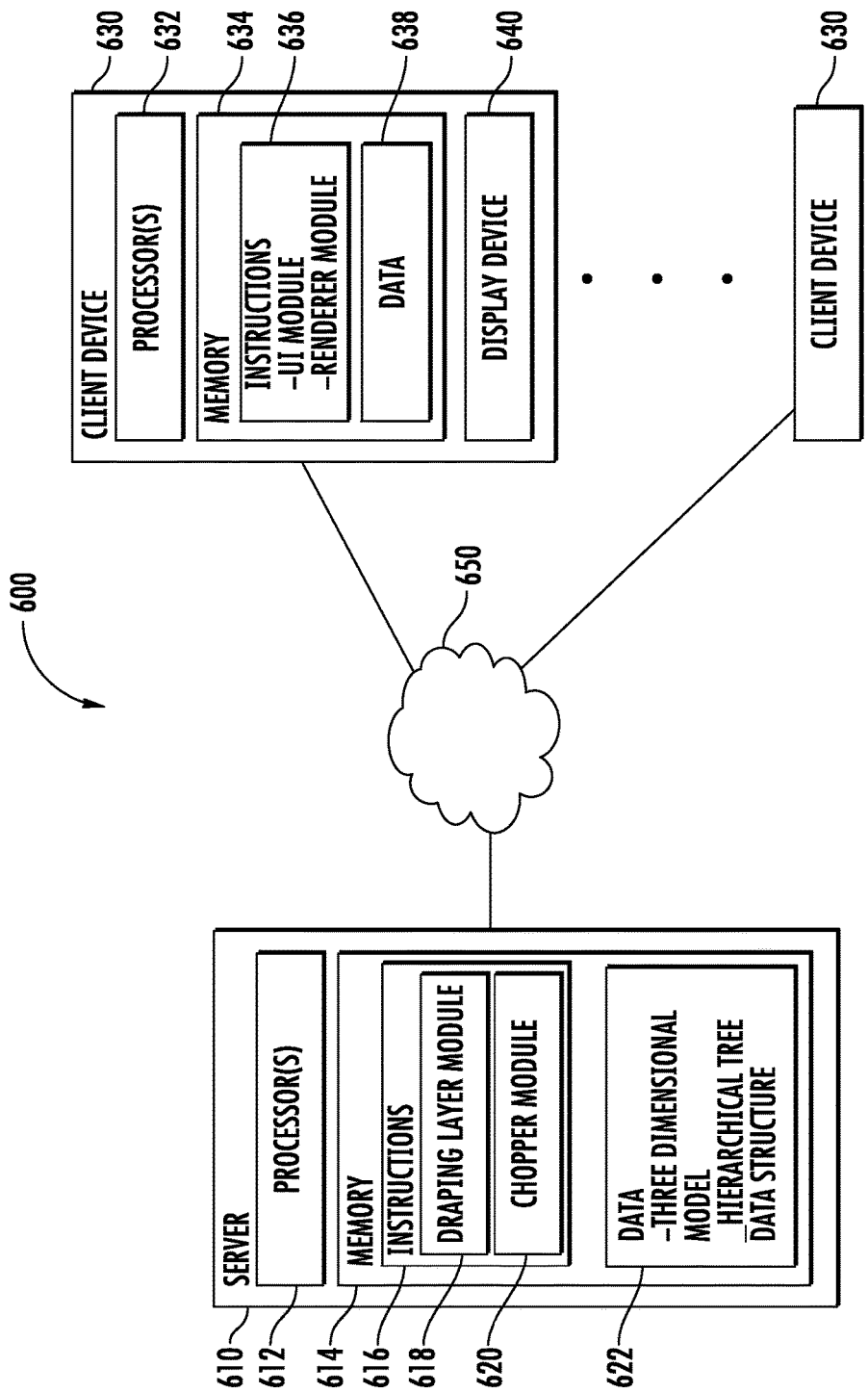
FIG. 6 depicts an exemplary computing system according to an exemplary embodiment of the present disclosure.

FIG. 6 depicts an exemplary computing system 600 that can be used to implement the methods and systems for merging three-dimensional models according to exemplary aspects of the present disclosure. The system 600 is a client-server architecture where a server 610 communicates with one or more client devices 630 over a network 650. The system 600 can be implemented using other suitable architectures.

The system 600 includes a computing device 610. The computing device 610 can be any machine capable of performing calculations automatically. For instance, the computing device can include a general purpose computer, special purpose computer, laptop, desktop, integrated circuit, mobile device, smartphone, tablet, or other suitable computing device. The computing device 610 can have a processor(s) 612 and a memory 614. The computing device 610 can also include a network interface used to communicate with one or more remote computing devices (e.g. client devices) 630 over a network 650. In one exemplary implementation, the computing device 610 can be a server, such as a web server, used to host a geographic information system, such as the Google Maps™ and/or the Google Earth™ geographic information systems provided by Google Inc.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a draping layer module 618 and a chopper module 620.

The draping layer module 618 can be configured to generate a smooth transparent draping layer according to exemplary aspects of the present disclosure. For instance, the draping layer module 618 can be configured to access a three-dimensional model and extract terrain geometry from the three-dimensional model. The draping layer module 618 can be configured to smooth the terrain geometry according to a suitable smoothing algorithm to generate smooth terrain geometry. The draping layer module 618 can then generate the transparent draping layer from the smooth terrain geometry, for instance, using a suitable meshing algorithm. The draping layer module 618 can generate a transparent draping layer for each level of detail of the three-dimensional model.

The chopper module 620 can spatially partition the transparent draping layer for each level of detail into a plurality of geospatial data objects (e.g. discrete geospatial volumes or tiles). The chopper module 620 can then store the discrete geospatial data objects in a hierarchical tree data structure encoded in the memory 614.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 614 can also include data 622 that can be retrieved, manipulated, created, or stored by processor(s) 612. For instance, memory 614 can store data 622 associated with the three dimensional model and the hierarchical tree data structure. The data 622 can be stored in one or more databases. The one or more databases can be connected to the computing device 610 by a high bandwidth LAN or WAN, or can also be connected to computing device 610 through network 650. The one or more databases can be split up so that it is located in multiple locales.

The computing device 610 can exchange data with one or more client devices 630 over the network 650. Although two clients 630 are illustrated in FIG. 4, any number of clients 630 can be connected to the computing device 610 over the network 650. The client devices 630 can be any suitable type of computing device, such as a general purpose computer, special purpose computer, laptop, desktop, integrated circuit, mobile device, smartphone, tablet, or other suitable computing device.

Similar the computing device 610, a client device 630 can include a processor(s) 632 and a memory 634. The memory 634 can store information accessible by processor(s) 632, including instructions 636 that can be executed by processor(s) 632 and data 638. The instructions 636 can be any set of instructions that when executed by the processor(s) 632, cause the processor(s) 632 to provide desired functionality. For instance, the instructions 636 can be executed by the processor(s) 632 to implement a user interface module and a renderer module.

The user interface module can be configured to present a viewport in a user interface on a display device 640. The renderer module can be configured to render vector data in conjunction with the three-dimensional model in the viewport according to any of the exemplary methods for rendering vector data in conjunction with three-dimensional models disclosed herein. For instance, the renderer module can be configured to render the three-dimensional model in the viewport and to render a transparent draping layer overlaying the three-dimensional model. The renderer module can be further configured to texture map vector data to the transparent draping layer such that the vector data appears to be located on a surface defined by the three-dimensional model.

Responsive to a request for information, the computing device 610 can encode data in one or more data files and provide the data files to the client devices 630 over the network 650. The network 650 can be any type of communications network, such as a local area network (e.g. intranet), wide area network (e.g. Internet), or some combination thereof. The network 650 can also include a direct connection between a client device 6300 and the computing device 610. In general, communication between the computing device 610 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for rendering vector data in conjunction with a three-dimensional model, comprising:

presenting, by one or more computing devices, a viewport in a user interface on a display device;

rendering, by the one or more computing devices, the three-dimensional model in the viewport, the three-dimensional model comprising terrain geometry providing a representation of terrain of a geographic area;

rendering, by the one or more computing devices, a transparent draping layer overlaying the three-dimensional model with a depth offset relative to the terrain geometry;

texture mapping, by the one or more computing devices, the vector data to the transparent draping layer such that the vector data appears to be located along a surface of the three-dimensional model in the viewport;

wherein the three-dimensional model comprising building geometry providing a representation of one or more buildings in the geographic area;

wherein rendering the transparent draping layer comprising rendering, by the one or more computing devices, the transparent draping layer with a depth offset relative to the terrain geometry but not relative to the building geometry;

wherein the vector data is occluded by the building geometry when the vector data is texture mapped to the transparent draping layer;

wherein rendering the three-dimensional model in the view port comprising:

rendering, by one or more computing devices, the building geometry in the viewport with a first stencil value in a stencil buffer for pixels associated with the building geometry;

rendering, by the one or more computing devices, the terrain geometry in the viewport with a second stencil value in a stencil buffer for pixels associated with the building geometry;

clearing, by the one or more computing devices, a depth buffer at pixels associated with the second stencil value in the stencil buffer; and wherein clearing the depth buffer at pixels associated with the second stencil value comprising writing, by the one or more computing devices, a maximum depth value to the depth buffer at all pixels associated with the second stencil value with depth write and depth test off.

2. The computer-implemented method of claim 1, wherein rendering the transparent draping layer comprises rendering, by the one or more computing devices, the transparent draping layer with depth test on.

3. A non-transitory computer-readable medium storing computer-readable instructions for execution by one or more processors when executed by the one or more processors cause the one or more processors to perform operations for rendering vector data in conjunction with a three-dimensional model of a geographic area, the three-dimensional model comprising terrain geometry associated with terrain of the geographic area and building geometry associated with one or more buildings in the geographic area, the operations comprising:

presenting a viewport in a user interface on a display device;

rendering the three-dimensional model in the viewport;

rendering a transparent draping layer conforming to the terrain geometry of the three-dimensional model with a depth offset relative to the terrain geometry;

texture mapping the vector data to the transparent draping layer such that the vector data appears to be located along a surface of the three-dimensional model in the viewport, the vector data being occluded at least in part by the building geometry in the three-dimensional model; and wherein the operation of rendering the three-dimensional model in the view port comprising:

rendering the building geometry in the viewport with a first stencil value in a stencil buffer for pixels associated with the building geometry;

rendering the terrain geometry in the viewport with a second stencil value in a stencil buffer for pixels associated with the building geometry; and clearing a depth buffer at pixels associated with the second stencil value in the stencil buffer;

wherein the transparent draping layer is rendered after clearing the depth buffer with depth write on and depth test on.

\* \* \* \* \*